US012115641B2

(12) United States Patent
Tulodziecki et al.

(10) Patent No.: US 12,115,641 B2
(45) Date of Patent: Oct. 15, 2024

(54) CONNECTION ASSEMBLY FOR A HAND-OPERATED MACHINE TOOL AND HAND-OPERATED MACHINE TOOL

(71) Applicant: Festool GmbH, Wendlingen (DE)

(72) Inventors: Stefan Tulodziecki, Neuhausen (DE); Hans-Peter Albrecht, Wendlingen (DE)

(73) Assignee: Festool GmbH, Wendlingen (DE)

( * ) Notice: Subject to any disclaimer, the term of this patent is extended or adjusted under 35 U.S.C. 154(b) by 792 days.

(21) Appl. No.: 17/414,550

(22) PCT Filed: Jul. 30, 2020

(86) PCT No.: PCT/EP2020/071597
§ 371 (c)(1),
(2) Date: Jun. 16, 2021

(87) PCT Pub. No.: WO2021/089206
PCT Pub. Date: May 14, 2021

(65) Prior Publication Data

US 2022/0009074 A1 Jan. 13, 2022

(30) Foreign Application Priority Data

Nov. 5, 2019 (DE) ..................... 10 2019 129 823.7

(51) Int. Cl.
*B25F 5/02* (2006.01)
*B24B 7/18* (2006.01)

(52) U.S. Cl.
CPC ................ *B25F 5/02* (2013.01); *B24B 7/184* (2013.01)

(58) Field of Classification Search
CPC ..... B25F 5/00; B25F 5/02; B24B 7/18; B24B 7/184; A01G 3/0251; B23G 3/18; B23G 3/22
See application file for complete search history.

(56) References Cited

U.S. PATENT DOCUMENTS 2,987,693 A * 6/1961 Wamsley ......... H01R 13/62933 439/157
7,774,901 B1 * 8/2010 Huang ................ A01G 3/0251 16/113.1
9,831,602 B1 * 11/2017 Kanda .............. H01R 13/62938
(Continued)

FOREIGN PATENT DOCUMENTS

CN 1614826 A 5/2005
CN 101334117 A 12/2008
(Continued)

OTHER PUBLICATIONS

CN First Office Action, dated Mar. 31, 2023. pp. 1-9.
(Continued)

*Primary Examiner* — Daniel J Wiley
(74) *Attorney, Agent, or Firm* — BOND, SCHOENECK & KING, PLLC; George R. McGuire

(57) ABSTRACT

A connection assembly for connecting a tool head and a further machine module of a machine tool, in particular a surface finishing machine, wherein the connection assembly (10) includes at least two connection parts following one another along a longitudinal axis and each having a connection section via which the connection parts are connectable to one another.

29 Claims, 17 Drawing Sheets

(56) References Cited

U.S. PATENT DOCUMENTS

| | | | | |
|---|---|---|---|---|
| 10,270,208 | B1 * | 4/2019 | Probert | H01R 13/6295 |
| 2006/0048397 | A1 | 3/2006 | King et al. | |
| 2011/0306283 | A1 | 12/2011 | Kresge | |
| 2012/0210585 | A1 * | 8/2012 | Gieske | B27B 17/0008 30/296.1 |
| 2014/0000065 | A1 * | 1/2014 | Bukovitz | B25G 3/18 403/345 |
| 2014/0134861 | A1 * | 5/2014 | Noda | H01R 13/62938 439/157 |
| 2015/0089821 | A1 * | 4/2015 | Troudt | B25G 1/04 16/427 |
| 2015/0295352 | A1 * | 10/2015 | Kim | H01R 13/62938 439/157 |
| 2017/0172362 | A1 | 6/2017 | Reimer et al. | |
| 2017/0279222 | A1 * | 9/2017 | Kayano | H01R 13/62977 |
| 2018/0069345 | A1 * | 3/2018 | Shimizu | H01R 13/62938 |
| 2018/0069347 | A1 * | 3/2018 | Shimizu | H01R 13/62938 |
| 2018/0337492 | A1 * | 11/2018 | Aoki | H01R 13/703 |
| 2019/0074633 | A1 * | 3/2019 | Ogashira | H01R 13/62955 |
| 2019/0148882 | A1 * | 5/2019 | Kosaka | H01R 13/62955 439/372 |
| 2019/0208974 | A1 | 6/2019 | Oka et al. | |
| 2019/0269069 | A1 * | 9/2019 | Boyles | B25G 1/04 |
| 2020/0014146 | A1 * | 1/2020 | Aoshima | H01R 13/6275 |
| 2021/0013674 | A1 * | 1/2021 | Akagi | H01R 13/62955 |
| 2023/0172111 | A1 * | 6/2023 | Zheng | B25F 5/00 30/276 |

FOREIGN PATENT DOCUMENTS

| | | | |
|---|---|---|---|
| CN | 106956174 | A | 7/2017 |
| CN | 109070302 | A | 12/2018 |
| DE | 102007012394 | A1 | 9/2008 |
| DE | 102014109583 | A1 | 12/2015 |
| EP | 2954977 | A1 | 12/2015 |

OTHER PUBLICATIONS

German Office Action, 10 2019 129 823.7, dated Jul. 9, 2020. pp. 1-4.

International Search Report and Non-Translated Written Opinion Form PCT/IS/210 and PCT/ISA/237, International Application No. PCT/EP2020/071597, pp. 1-7, International Filing Date Jul. 30, 2020, mailing date of report Dec. 1, 2020.

* cited by examiner

Detail A:

CONNECTION ASSEMBLY FOR A HAND-OPERATED MACHINE TOOL AND HAND-OPERATED MACHINE TOOL

CROSS-REFERENCE TO RELATED APPLICATIONS

This is a National Stage Application filed under 35 U.S.C. 371 based on International Patent Application No. PCT/EP2020/071597, filed on Jul. 30, 2020, which claims priority to German Patent Application No. 10 2019 129 823.7 filed on Nov. 5, 2019, the disclosures of both of which are incorporated herein by reference in their entireties.

BACKGROUND

The invention relates to a connection assembly, a machine tool and an extension piece.

Machine tools are known from the prior art, for example from DE 10 2007 012 394 A1 from the applicant. This document describes a hand-operated machine tool comprising a handle bar which has a plurality of handle bar parts that are connectable to one another by means of a clamping device. The length of the handle bar can thus be changed to adapt the machine to the task at hand and the handle bar can be dismantled for transport purposes. This makes the machine tool easier to handle.

Several hand movements are required for connecting and detaching the handle bar parts. For example, the handle bar parts have to be brought together for connection and held in this position in order to then bring the two tie rods into engagement with parts for engagement from behind and clamp said tie rods and engagement parts by means of the two manual operating levers. In addition, the electrical connector plug has to be attached to plug contacts. Disassembly takes place in the reverse order, with several hand movements also being required for this. In this respect, there is potential for optimization.

The object of the invention is to facilitate the handling of a hand-operated machine tool, in particular its assembly and disassembly, using simple structural means.

The invention achieves this object by means of a connection assembly characterized in that inside the respective (inner) cross-section an electrical plug connector, a mechanical clamping element and a connection opening to a flow channel formed in the respective connection part are provided in such a way that when the connection sections are plugged together, the clamping elements engage behind one another and the plug connectors (electrical plug connection) and/or the connection openings (flow connection) are connected to one another.

Such a configuration promotes quick and easy handling, since the interfaces (mechanical clamping connection, electrical plug connection and/or flow connection between the flow channels) arranged in the connection sections are automatically connected when the connection parts are plugged together. Only a few hand movements are thus required for connecting and detaching the connection parts. This reduces the risk of injury or damage. The arrangement of the plug connector, the clamping element and the connection opening inside the cross-section of the relevant connection section contributes to a compact design of the connection assembly, the interfaces mentioned being protected from environmental influences such as dust, dirt or the like.

The machine tool that is equipped with such a connection assembly can be, for example, a hand-operated machine tool. Irrespective of this, the connection assembly can be a connection line, for example a hose or a pipe.

The connection parts can have, for example, a pipe section, a connection section being formed at one end or at both ends of the pipe section.

The further machine module can be a handle part. Optionally, the handle part can have display elements and/or operating elements for monitoring or operating the machine tool, respectively. The (inner) cross-section of the connection parts can be, for example, an inner chamber.

In a preferred embodiment, the connection parts are detachably connectable to each other. The connection assembly can thus be assembled or disassembled in a simple manner. For example, the connection assembly can be assembled for use of the machine tool and disassembled for transport or storage.

The clamping element can advantageously be arranged substantially centrally within the cross-section. This contributes to an even clamping (based on the circumference) of the connection parts. "Substantially centrally" can be understood to mean that the clamping element is arranged in the middle 1 to 30 percent of the inner cross-section (based on the cross-sectional area), at approximately half the height of the cross-section of the connection section.

Expediently, the plug connector can be arranged on one side of the clamping element and the connection opening of the flow channel can be arranged on the side of the clamping element facing away from the plug connector. This contributes to a space-saving and symmetrical arrangement of the interfaces in the connection section. In other words, the clamping element can be arranged between the plug connector and the connection opening. The clamping element can be arranged at or on the central longitudinal axis of the relevant connection part and the plug connector and the connection opening can be arranged to the side of the central longitudinal axis, in particular on opposite, preferably diametrically opposite, sides.

In a preferred embodiment, the connection sections can each have a single-part or multi-part sheathing which encloses the respective connection parts sectionally. This allows ends of the connection parts, for example ends of the pipe sections of the connection parts, to be protected. The sheathing can be in the form of a sleeve, for example. The sheathing can be designed so as to be separate from the connection part or its pipe section or can coincide with the connection part or its pipe section, for example by the connection part being designed as a hybrid component (sheathing is attached directly to the connection part or its pipe section).

Advantageously, one of the connection sections (connection section of a first connection part), in particular on its sheathing, can have a collar projecting parallel to the longitudinal axis, by which said connection section encompasses the opposite connection section (connection section of the other connection part) when plugged together. Plugging together is thus simplified, since the connection sections are guided through the collar. The interfaces of the connection sections can thereby be aligned with one another. The collar contributes to the protection of the interfaces of the connection sections from environmental influences. The collar is preferably designed to be an all-around collar.

Expediently, the collar can have an outwardly widening, in particular conically shaped, inner surface and the opposite connection section, in particular on its sheathing, can have an outwardly tapering, in particular conically tapered, outer surface. This makes it easier to plug the connection sections together, since the respective interfaces of the connection sections to be plugged together (plug connector, clamping element and connection opening) are aligned with one another.

In a preferred embodiment, the connection sections, in particular on their sheathing, can have a resting section covering the end face of the respective connection part, the resting sections coming into contact with one another when the connection sections are plugged together. This creates defined resting sections at which the connection parts are in contact with one another when plugged together. In this way, for example, pipe sections of the connection parts can be prevented from resting directly on one another. Wear is reduced to a minimum.

Advantageously, the connection section, which is encompassed by the opposite connection section when plugged together, can have a radially projecting protrusion at its end (rear end) facing away from the free end of the respective connection part. This can reduce the risk of foreign body entry. Optionally, the protrusion can limit the plugging together of connection parts in the direction of insertion. The protrusion itself can have a triangular or trapezoidal cross-section. In this way, a gradual transition between the connection section and the connection part or its pipe section can be achieved. This has a beneficial effect on the ergonomics.

Expediently, the plug connectors can be embodied as multipole connectors with at least two poles each (two-pole or multipole design). This provides for the transmission of current (power supply) and signals. For example, a 7-pole or 7-wire design of the plug connectors is conceivable.

In a preferred embodiment, the plug connector, the clamping element and/or the connection opening can be arranged flush with or inwardly offset relative to the end face of the connection section. In other words, these elements do not protrude from the end face of the relevant connection section. This provides the interfaces with a certain degree of protection from environmental influences. This also reduces the risk of injury to the user. Wear on the interfaces can also be kept to a minimum.

Advantageously, at least one of the plug connectors can be mounted via an elastic element on the connection section or on the connection part respectively, in particular in such a way that the plug connector is movable relative to the connection section or to the connection part. The plug connectors thus have a certain amount of play so that the connection parts can be plugged together more easily.

Specifically, the plug connector can be returnable by the elastic element into a, preferably central, initial position. This creates a defined initial position. If the plug connector rotates off-center, it can be returned into the initial position by means of the return element.

In a preferred embodiment, one or more dust removal openings can be formed in the plug connector, in particular adjacent to its plug contacts. This reduces the risk of dust deposits that impair the function of the electrical plug connectors. The dust removal openings can be flow-connected to the flow channel (suction channel) formed in the relevant connection part by means of a flow connection.

Expediently, the plug connectors of the connection sections of a first of the connection parts and of the second connection part can be formed partially or fully complementary to each other. This means that the connection sections can be plugged together (partially or fully complementary design of the plug connectors). A plug connector of one connection section can be designed as a plug and the plug connector of a second connection section can be designed as a socket.

Advantageously, the connection parts can each have a wall extending parallel to or along their longitudinal axis, which wall divides the cross-section of the connection parts into separate sections respectively, wherein the flow channel (suction channel) is arranged in a first section respectively and the plug connector and the clamping element are arranged in a further section respectively. The plug connector and the clamping element are thus separate from the flow channel and are not adversely affected by discharged grinding dust, for example.

In a preferred embodiment, an actuating device can be arranged on at least one of the connection sections, which device is coupled via a clamping device to the clamping element arranged on this connection section, so that the connection parts are clampable against one another by actuation of the actuating device when the clamping elements are engaged. This makes it possible for the connection parts to be clamped together easily and quickly. The actuating device can be a (manually actuatable) clamping lever or an (electrically or electronically controllable) actuator.

Advantageously, a further connection part can be provided, which has a connection section at each end, so that the further connection part can be inserted as an extension piece between the two connection parts and connected thereto, in particular detachably. The length of the connection assembly and the machine tool can thus be adjusted as required. Inserting the further connection part provides for a lengthening and removing the connection part provides for a shortening.

The clamping elements can be designed as a clamping element on a connection section, the clamping element interacting with a clamping device and/or actuating device arranged on this connection section. The clamping element can be designed as a clamping claw. On the opposite connection section, the clamping element can be designed as a counter element which can engage with the clamping element (clamping claw). The counter element can be a hook-shaped element or a hook.

The object mentioned at the outset is also achieved by a preferably hand-operated machine tool having the features of the additional independent claim. The machine tool has a tool head, a further machine module and a connection assembly for connecting the tool head and the machine module as described above. The hand-operated machine tool can be a surface finishing machine, for example a long-neck sander. The tool head can be designed as a grinding head, for example. The further machine module can be a handle part, for example.

With regard to the advantages that can be achieved with the machine tool, reference is made to the relevant statements regarding the connection assembly. The measures described in connection with the connection assembly can be used to further develop the machine tool.

The object mentioned at the outset is also achieved by an extension piece for a connection assembly having the features of the other additional independent claim. The extension piece constitutes a further extension part for a connection assembly, as described above.

The extension piece has in particular at both ends a respective connection section so that the extension piece can be inserted between the two connection parts and connected thereto for the purpose of lengthening. With regard to the advantages that can be achieved with the extension piece, reference is made to the relevant statements regarding the connection assembly.

Advantageously, the extension piece for a connection assembly can be used to connect a tool head and a further machine module of a preferably hand-operated machine tool. The extension piece has at both ends a respective connection section via which the extension piece is connectable to a connection part of the connection assembly respectively, wherein the connection sections of the extension piece each delimit an inner cross-section (e.g. inner chamber) toward the outside. The extension piece is characterized in that within the respective cross-section an electrical plug connector, a mechanical clamping element and a connection opening to a flow channel formed in the extension piece are provided. In this way, the extension piece as a (further) connection part can be connected to a connection part just as advantageously as the connection parts of the connection assembly described above.

In a preferred embodiment, the electrical plug connector, the mechanical clamping element and the connection opening can be provided in such a way that, when a connection section of the extension piece is plugged together with a connection part of the connection assembly, the clamping elements engage behind one another and the plug connectors and/or the connection openings are respectively connected to one another. This makes it easier to connect the extension piece to further connection parts.

Expediently, the connection sections of the extension piece can be formed complementary (partially complementary or fully complementary) to one another. In other words, the two connection sections of the extension piece could be plugged together. The extension piece can thus be easily inserted between the further connection parts of the connection assembly. It is also conceivable for a plurality of extension pieces to be plugged together in order to lengthen the connection assembly.

The clamping element can advantageously be arranged substantially centrally within the cross-section. This contributes to an even clamping (based on the circumference) of the extension piece to further connection parts. “Substantially centrally” can be understood to mean that the clamping element is arranged in the middle 1 to 30 percent of the inner cross-section (based on the cross-sectional area), at approximately half the height of the cross-section of the connection section.

Expediently, the plug connector can be arranged on one side of the clamping element and the connection opening of the flow channel can be arranged on the side of the clamping element facing away from the plug connector. This contributes to a space-saving and symmetrical arrangement of the interfaces in the connection section. In other words, the clamping element can be arranged between the plug connector and the connection opening. The clamping element can be arranged at or on the central longitudinal axis of the extension piece and the plug connector and the connection opening can be arranged to the side of the central longitudinal axis, in particular on preferably diametrically opposite sides.

Expediently, the plug connectors can be embodied as multipole connectors with at least two poles each (two-pole or multipole design). This provides for the transmission of current (power supply) and signals. For example, a 7-pole or 7-wire design of the plug connectors is conceivable. The plug connectors arranged at both ends of the extension piece are electrically connected to one another by means of electrical or electronic lines. Current and/or control signals can thus be transmitted through the extension piece by means of the electrical plug connectors.

In a preferred embodiment, the plug connector, the clamping element and/or the connection opening can be arranged flush with or inwardly offset relative to the end face of the connection section. In other words, these elements do not protrude from the end face of the relevant connection section. This provides the interfaces with a certain degree of protection from environmental influences. This also reduces the risk of injury to the user. Wear on the interfaces can also be kept to a minimum.

Advantageously, an actuating device can be arranged on one of the connection sections, which device is coupled via a clamping device to the clamping element arranged on this connection section, so that the extension piece is clampable to a further connection part by actuation of the actuating device when the clamping elements are engaged. This makes it possible for the extension piece to be clamped to a further connection part easily and quickly. The actuating device can be a (manually actuatable) clamping lever or an (electrically or electronically controllable) actuator.

In a preferred embodiment, the extension piece can have a wall extending parallel to or along the longitudinal axis respectively, which wall divides the cross-section of the extension piece into separate sections, wherein the flow channel is arranged in a first section and the plug connector and the clamping element (both connection sections of the extension piece) are respectively arranged in a further section. The plug connector and the clamping element are thus separate from the flow channel and are not adversely affected by discharged grinding dust, for example.

The measures described in connection with the connection assembly can be used to further develop the connection sections of the extension piece.

The invention is explained in more detail below with reference to the drawings, the same or functionally similar elements being provided with identical reference signs, but in some cases only once. In the drawings.

Figure 1:
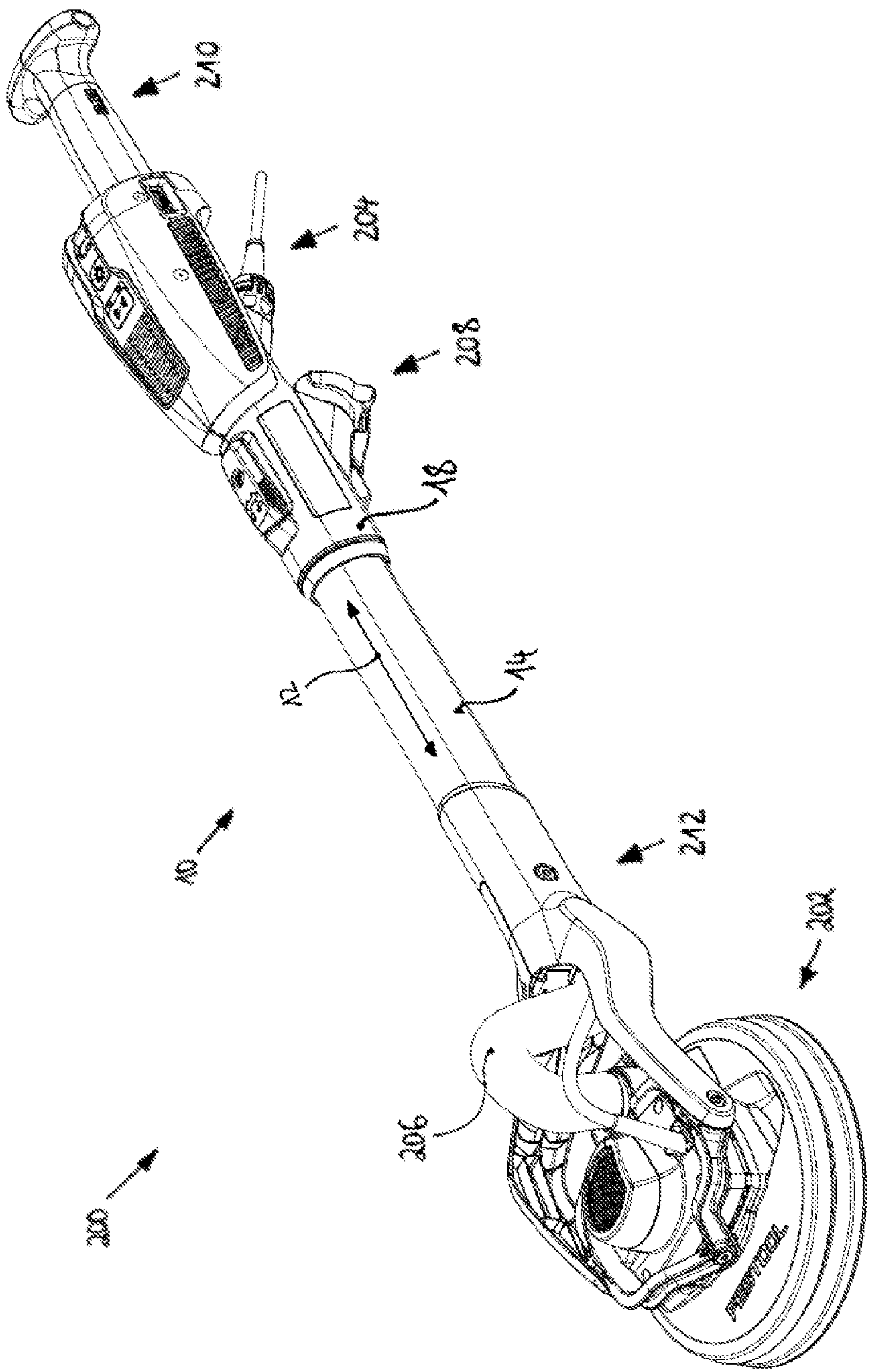
FIG. 1 is a perspective view of an embodiment of a hand-operated machine tool and a connection assembly comprising two connection parts.

FIG. 1 shows a hand-operated machine tool, which is designated as a whole by reference sign 200 (hereinafter "machine tool"). By way of example, the machine tool 200 is designed as a surface finishing machine 200 in the form of a long-neck sander.

The machine tool 200 has a tool head 202 in the form of a grinding head 202. In addition, the machine tool 200 has a further machine module 204 in the form of a handle part 204. The machine tool 200 also has a connection assembly 10 for connecting the grinding head 202 and the handle part 204.

A hose section 206 is arranged on the grinding head 202, one end of which section is flow-connected to a suction point (not shown) located on the grinding head 202. The other end of the hose section 206 is flow-connected to a hose outlet 208 arranged on the handle part 204, specifically by means of the connection assembly 10. A hose (for example a suction hose) can be connected to the hose outlet 208, the other end of which hose can be connected to a vacuum cleaner (not shown), for example. In this way, grinding dust that forms on the grinding head 202 can be sucked up at the suction point and discharged via the hose section 206, the connection assembly 10 (flow channel or suction channel) and the hose outlet 208.

There are also current-carrying lines (provision of electrical power; without reference signs) and control lines (provision of control signals; without reference signs) on the grinding head 202. The lines and control lines are electrically or electronically connected at one end to components arranged on the grinding head 202. At the other end, these components are electrically or electronically connected to control and supply devices (without reference signs) arranged on the handle part 204, specifically via the connection assembly 10 (electrical plug connection). The handle part 204 can have a handle section 210 at which the handle part 204 can be gripped or grasped by a user's hand.

The connection assembly 10 can have a connection part 14 and a further connection part 18, which can be connected to and detached from one another (see FIG. 1). In other words, the connection parts 14, 18 are detachably connectable to one another. The connection part 18 is formed on the handle part 204 and has a connection section which corresponds to the connection section 22 described below (see FIG. 3*f.*). The handle part 204 and its connection section can be made of plastics material, for example.

The connection part 14 has at one end a connection section 20 described below (cf. FIG. 3*f.*) which can be plugged together with the connection section (without a reference sign) formed on the handle part 204. At the other end, the connection part 14 is connected to a connection piece 212 which carries the grinding head 202.

Figure 2:
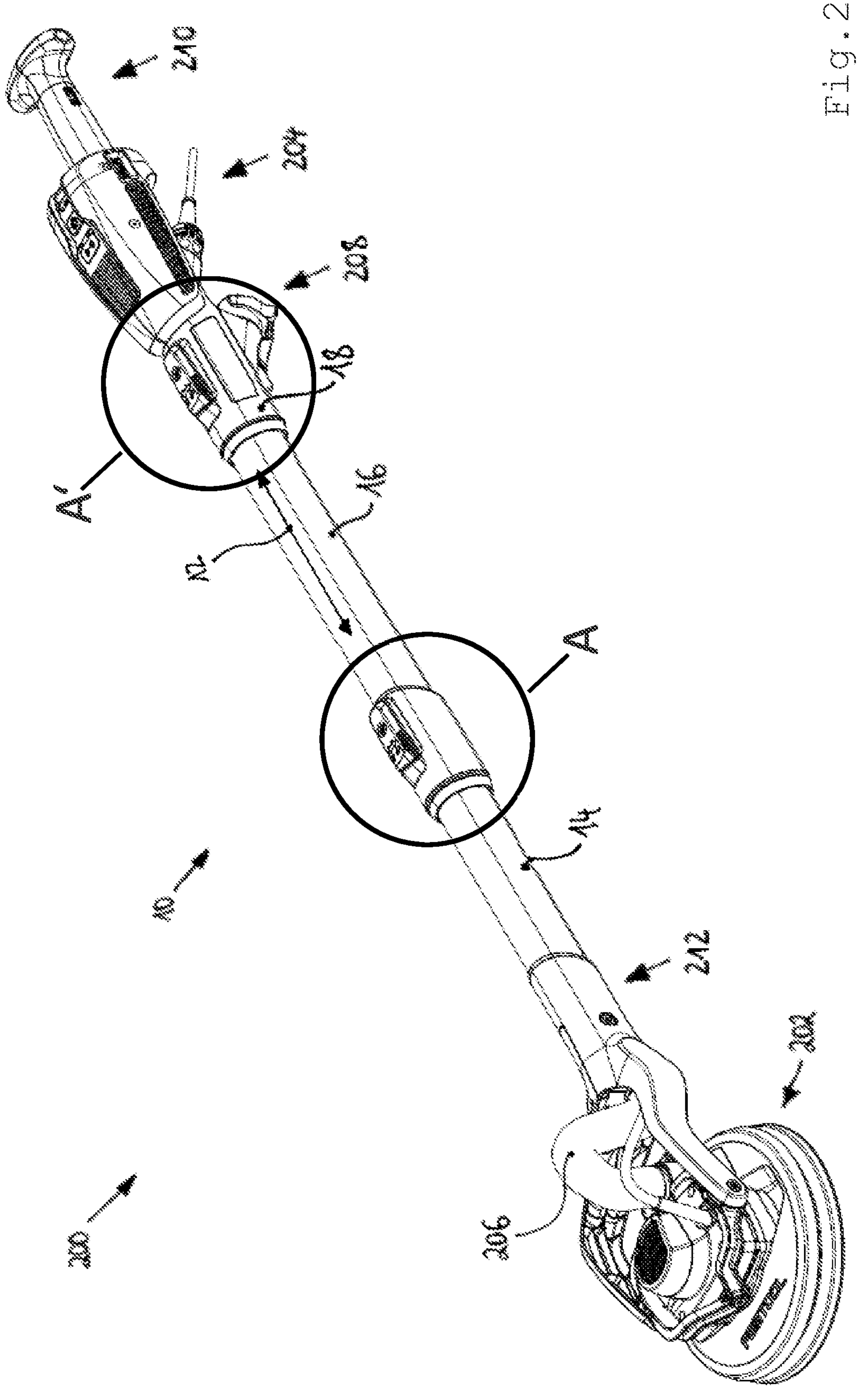
FIG. 2 shows the machine tool from FIG. 1, with an extension piece being used as a further connection part in the connection assembly.

Optionally, the connection assembly 10 can have at least one further connection part 16, which can be inserted between the two other connection parts 14, 18 as an extension piece 16 (see FIG. 2). For this purpose, the extension piece 16 has a connection section 20 at one end and a connection section 22 at the other end, as is described further below.

The connection assembly 10 is described in more detail below, specifically with reference to the connection section 20 of the connection part 14 and the connection section 22 of the connection part 16 (cf. marking "A" in FIG. 2 and FIG. 3*f.*). A corresponding connection assembly 10 is located between the connection part 14 and the connection part 18 and between the connection part 16 and the connection part 18 (cf. marking "A," only indicated in FIG. 2).

The connection assembly 10 as a whole forms a connection line, for example a connection pipe. The connection parts 14, 16 each have a pipe section, for example a section of an aluminum pipe, on which a connection section 20, 22 is formed respectively.

As already indicated, the connection assembly 10 is used to connect the grinding head 202 and the handle part 204 of the hand-operated machine tool 200 in the form of a long-neck sander. For this purpose, the connection assembly 10 has (at least) two connection parts 14, 16 following one another along a longitudinal axis 12 (cf. FIG. 3*f.*). The connection parts 14, 16 are detachably connectable to one another.

Figure 5:
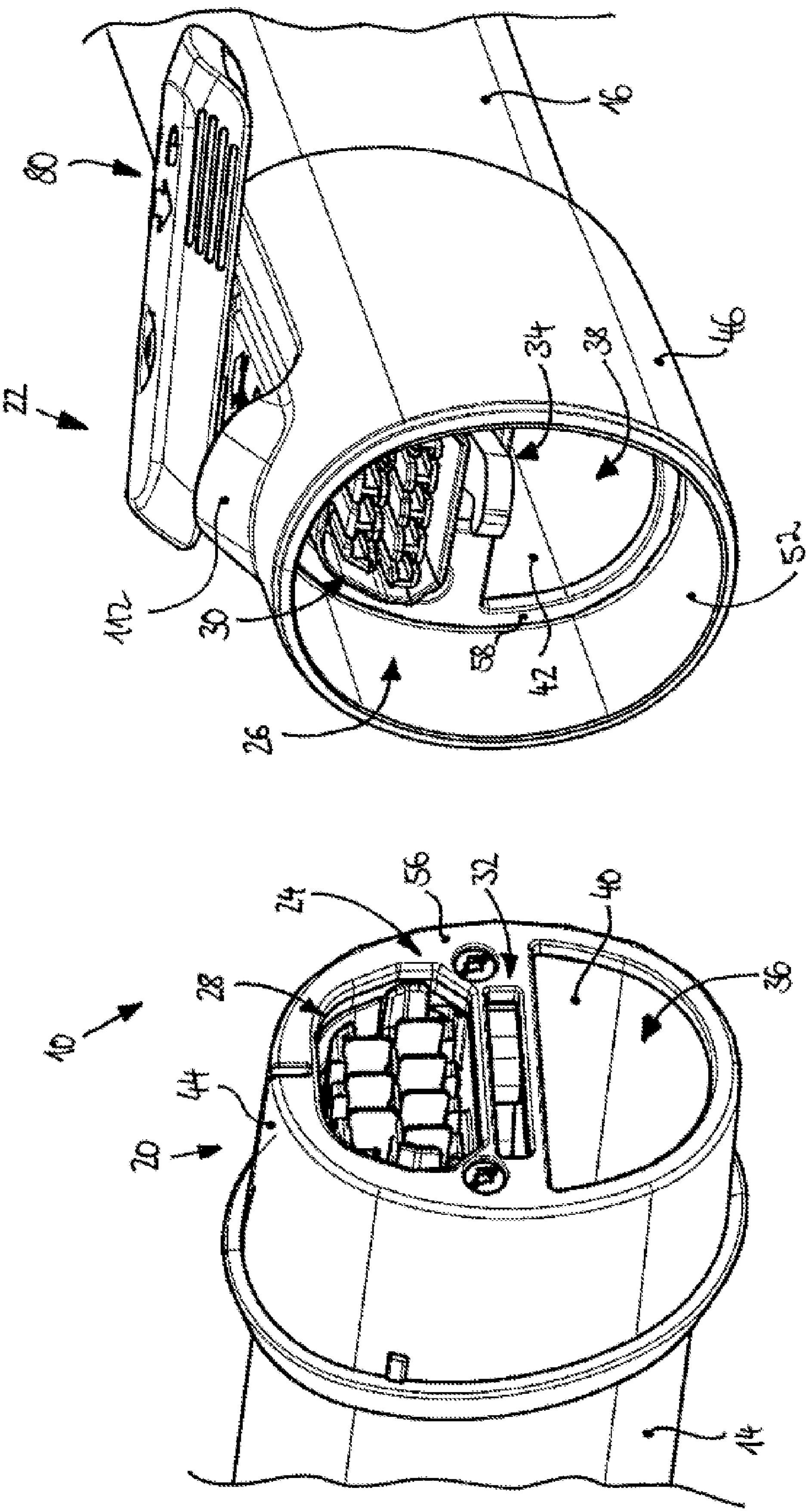
FIG. 5 shows the connection sections from FIG. 3 with a view into the interior of the connection sections and the respective connection parts.

The connection part 14 has a connection section 20. The connection part 16 has a connection section 22. The connection parts 14, 16 are connectable to one another via the connection sections 20, 22, specifically by plugging the connection sections 20, 22 together. The connection sections 20, 22 each delimit an inner cross-section 24, 26 toward the outside (see inter alia FIGS. 5 and 6).

At the connection sections 20, 22, the connection parts 14, 16 each have three different interfaces which are each arranged in the inner cross-section 24, 26 or inner chamber 24, 26 of the relevant connection section 20, 22. The interfaces are an electrical plug connection, a mechanical clamping connection and a flow connection. The clamping connection is spatially arranged between the plug connection and the flow connection and is located approximately in the center of the connection sections.

The connection part 14 has in the inner cross-section 24 an electrical plug connector 28 which forms a component of the electrical plug connection. The plug connector 28 can be designed as a socket (female part), for example. In addition, the connection part 14 has a clamping element in the form of a counter element 32 which forms a component of the mechanical clamping connection. The counter element 32 can be designed as a hook-shaped element or hook 32, for example. The connection part 14 also has a connection opening 36 to a flow channel 40 formed in the connection part 14 (suction channel), part of the flow connection being formed thereby.

The connection part 16 has in the inner cross-section 26 an electrical plug connector 30 which forms a component of the electrical plug connection. The plug connector 30 can be designed as a plug (male part), for example. In addition, the connection part 16 has a clamping element 34 which forms a component of the mechanical clamping connection. The clamping element 34 can be designed as a claw-shaped element or clamping claw 34, for example. The clamping element 34 can be actuated by means of an actuating device in the form of a clamping lever 80. The connection part 16 also has a connection opening 38 to a flow channel 42 formed in the connection part 14, part of the flow connection being formed thereby.

The connection part 14 is described in more detail below. As already indicated, the connection part 14 has a pipe section, the connection section 20 being arranged at one of the ends thereof. The connection section 20 has a sheathing 44 which encloses the connection part 14 (at its free end) sectionally (see FIGS. 5 and 6). On the end face, the sheathing 44 has three passages (without reference signs) for the electrical plug connector 28, the counter element 32 and the connection opening 36.

The sheathing 44 has an outer surface 54 which tapers outwardly, i.e. toward the free end, in particular conically. In addition, the sheathing 44 has a resting section 56 covering the end face of the connection part 14 (end-face end of the pipe section). When the connection parts 14, 16 are plugged together, the resting section 56 can come into contact with a resting section 58 of the connection part 16. At its end facing away from the free end of the connection part 14, the sheathing 44 has a radially projecting protrusion 60. The protrusion 60 can limit the plugging together of the connection parts 20, 22 in the direction of insertion. Irrespective of this, the protrusion 60 creates a smooth transition of the contour from the sheathing 44 to the pipe section of the connection part 14.

In the pipe section of the connection part 14, a wall 66 extending parallel to or along the longitudinal axis 12 is provided, which wall divides the (inner) cross-section of the connection part 14 into two separate sections 70, 72. The flow channel 40 is arranged in the first section 70. The counter element 32 and the electrical plug connector 28 are arranged in the further section 72.

Figure 13:
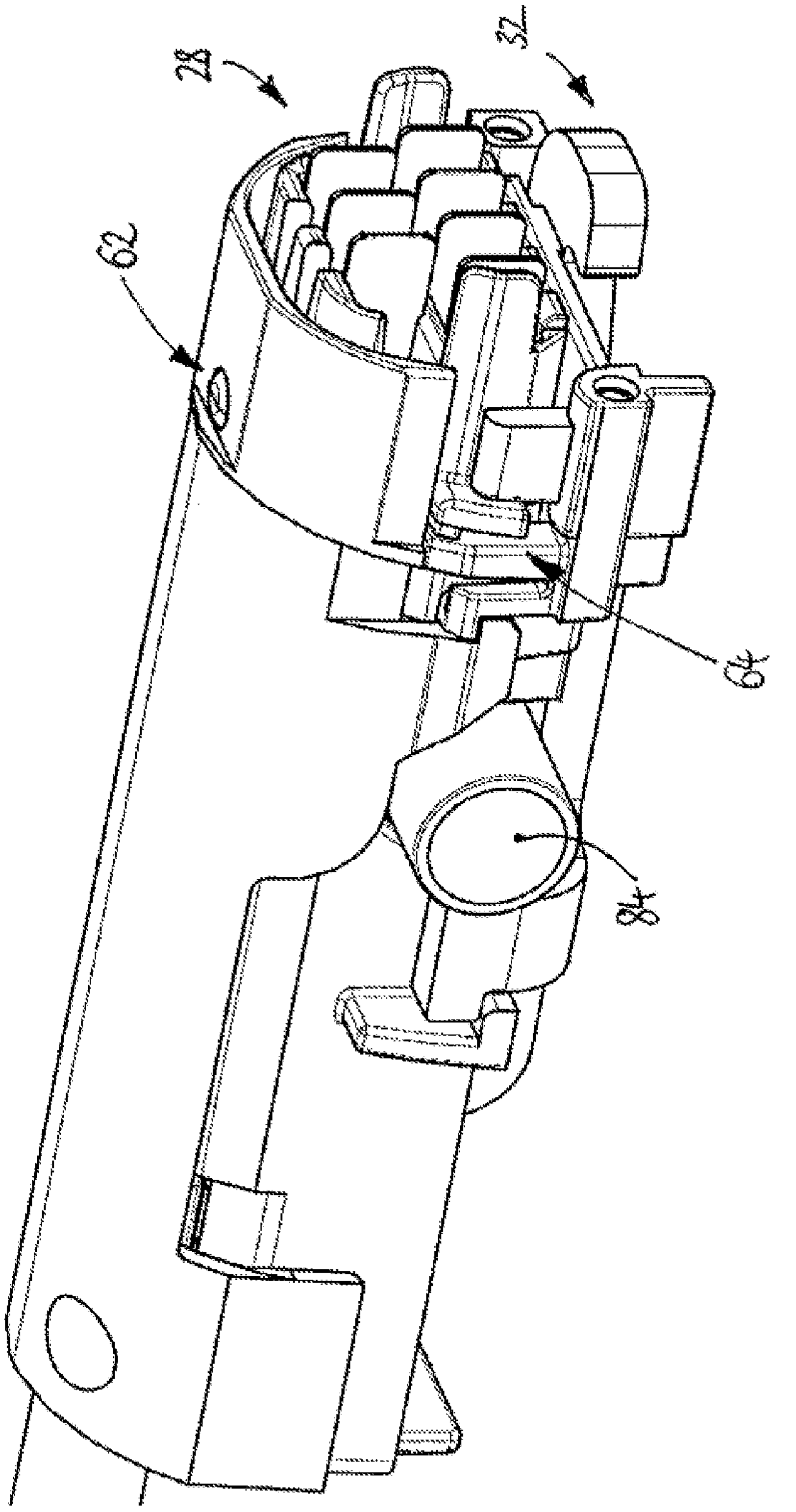
FIG. 13 shows the counter element and the plug connector of the connection assembly according to FIG. 3 in isolation.
Figure 14:
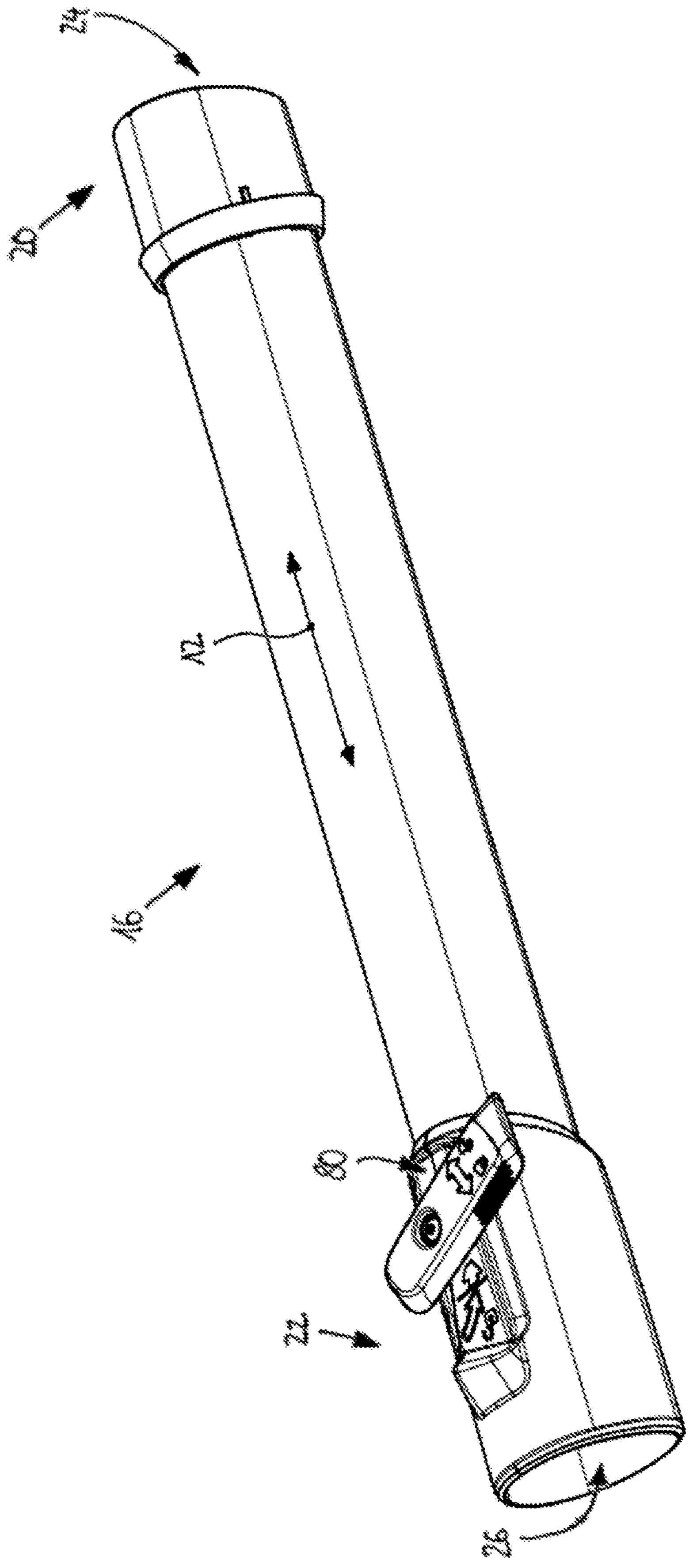
FIG. 14 is a perspective view of the extension piece of the connection assembly from FIG. 2 in isolation.
Figure 15:
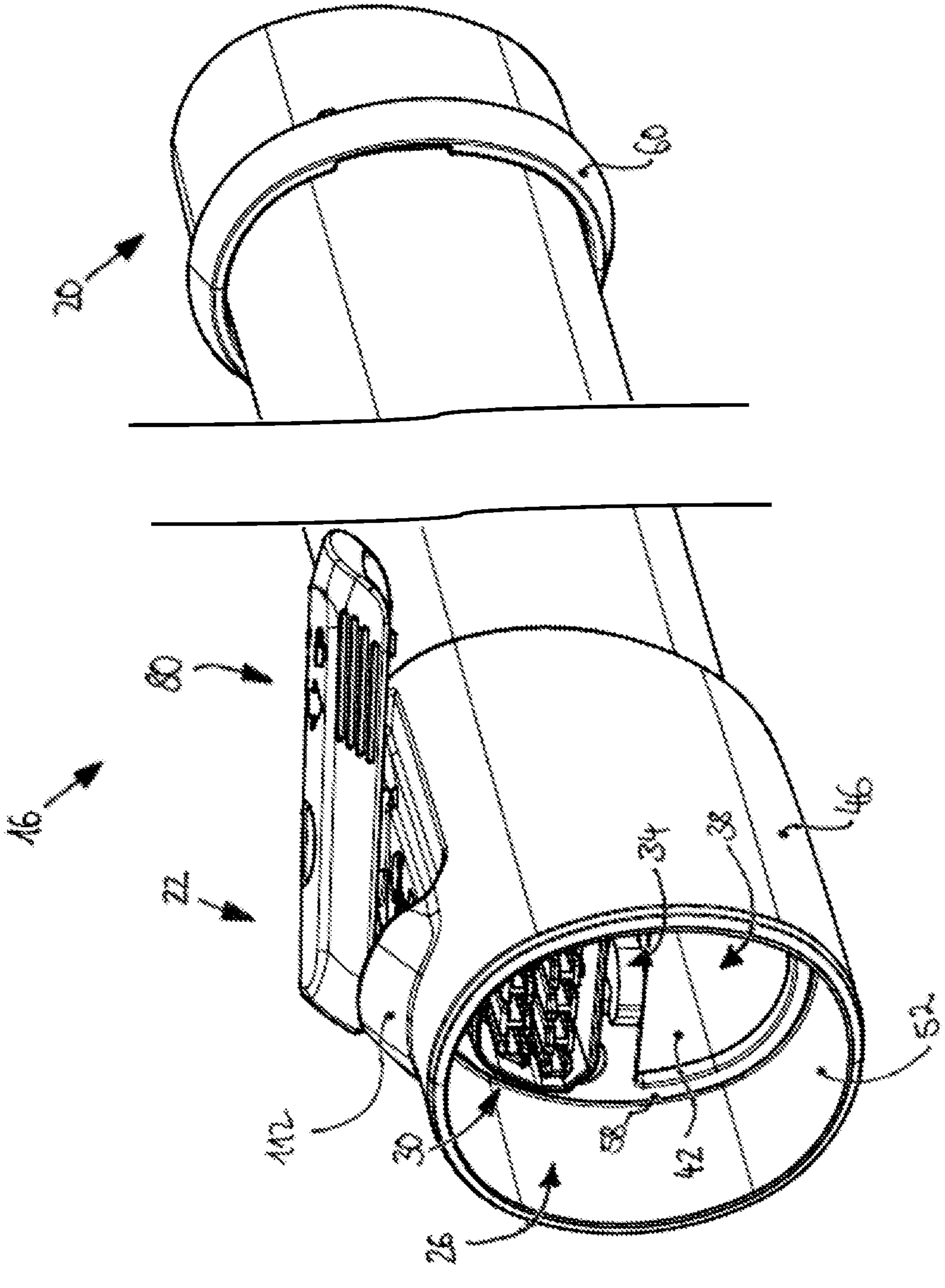
FIG. 15 shows the extension piece according to FIG. 14. with a view of one of the connection sections.
Figure 16:
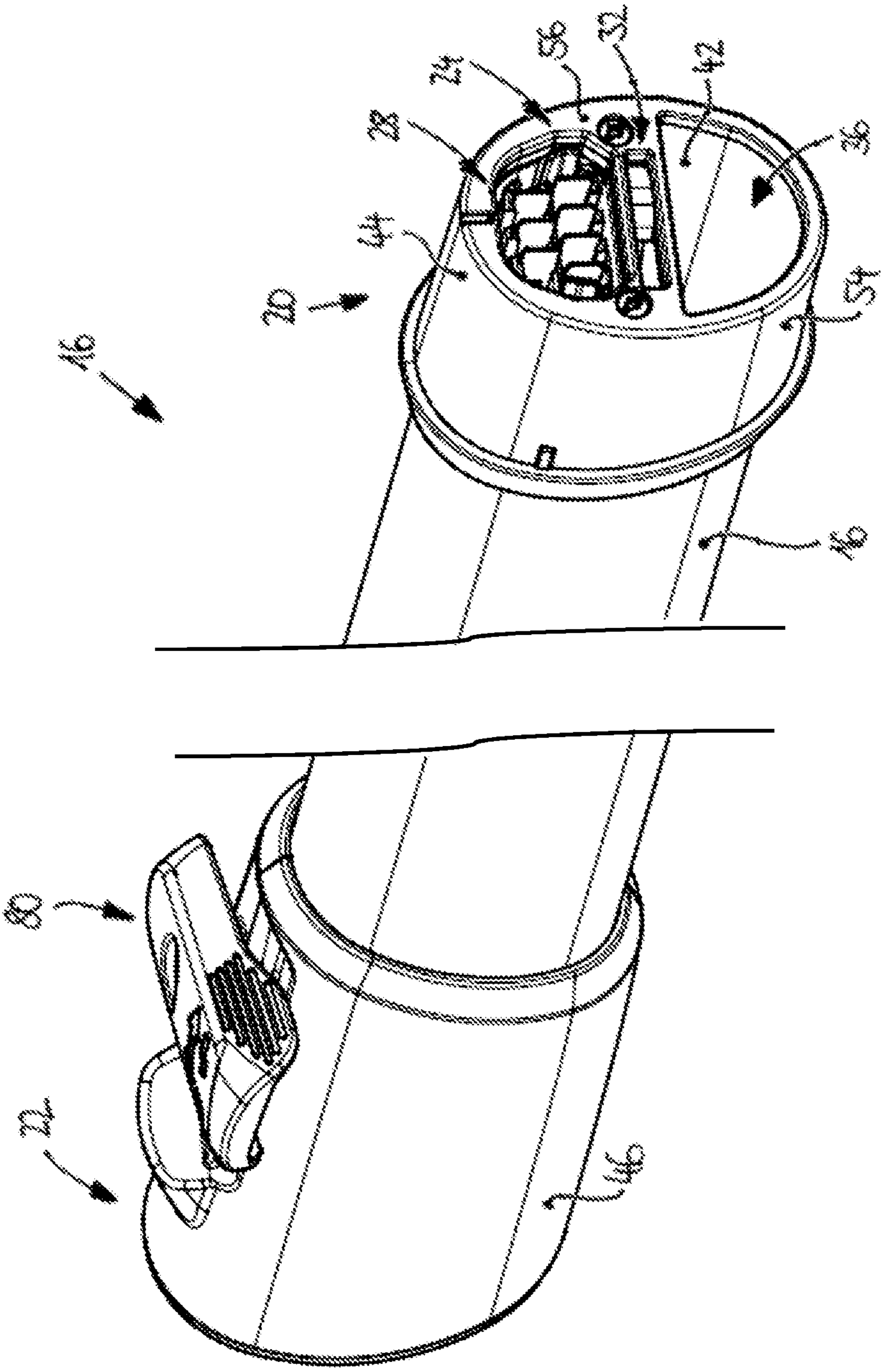
FIG. 16 shows the extension piece according to FIG. 14 with a view of the other connection section.
Figure 17:
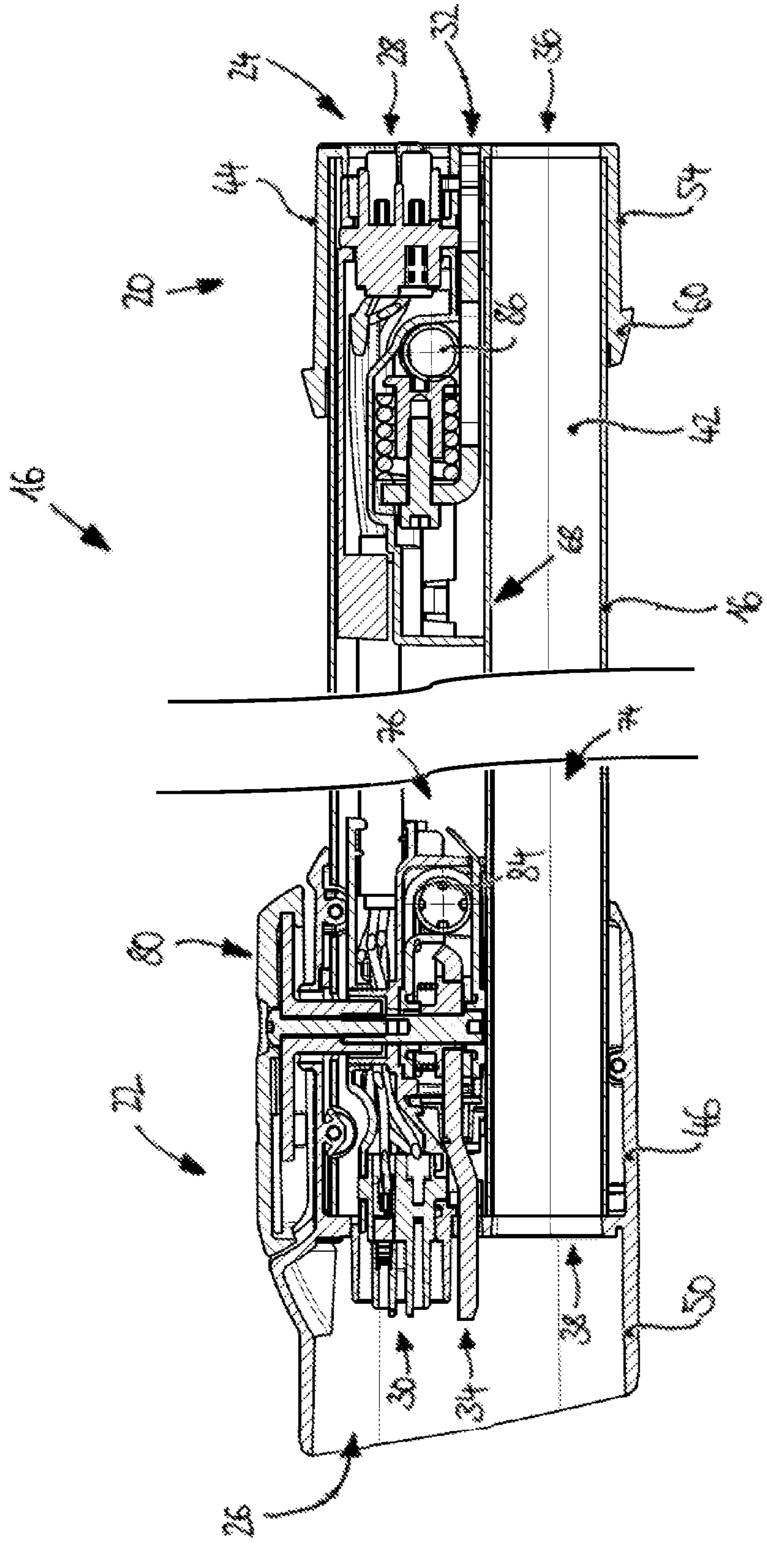
FIG. 17 is a half section through the extension piece according to FIG. 14.

The plug connector 28 is mounted on the connection part 14 via an elastic element 64 (see FIG. 13). Due to the elastic element 64, the plug connector 28 is movable relative to the connection section 20 or to the connection part 14. The plug connector 28 is returnable by the elastic element 64 into a, preferably central, initial position. If the plug connector 28 has rotated off-center, it can be returned by means of the elastic element 64. Dust removal openings can optionally be formed on the plug connector 28 (not shown). These openings reduce dust deposits on the plug connector 28. The dust removal openings can be flow-connected to the flow channel 40.

The counter element 32 is secured to the connection part 14 by means of a transverse bolt 84 (cf. inter alia FIGS. 6 to 10 and 13). The transverse bolt 84 projects transversely to the longitudinal axis 12 through the cross-section 24 of the connection part 14. With each of its ends, the cross-section 84 engages in a passage 88 formed in the wall of the connection part 14 (wall of the pipe section) (see FIG. 8).

The counter element 32 is movably guided on the connection part 14 and is movably mounted on the connection part 14 by the interposition of a spring 106. The (hook-shaped) counter element 32 transitions into a holding section 108, the holding section 108 having an angled section 110 (see inter alia FIGS. 7 and 8). The spring 106 is arranged between the angled section 110 and the transverse bolt 84 (see FIG. 8). The spring 106 is fastened to the angled section 110 by means of a screw 11, a guide bush 113 which guides the spring 106 being screwed onto the screw. The spring 106 is designed in particular as a compression spring 106.

The connection part 16 is described in more detail below. As already indicated, the connection part 16 has a pipe section, the connection section 22 being arranged at one of the ends thereof. The connection section 22 has a sheathing 46 which encloses the connection part 16 (at its free end shown here) sectionally (see FIG. **4*f*.). On the end face, the sheathing 46 has a plurality of passages (without reference signs) for the electrical plug connector 30, the clamping element 34 and the connection opening 38**.

The sheathing 46 has a collar 50 projecting parallel to the longitudinal axis 12 (see FIG. 6), by which the connection section 22 encompasses the opposite connection section 20 when the connection parts 14, 16 are plugged together. The collar 50 has an outwardly widening, in particular conically widening, inner surface 52. The inner surface 52 is designed in particular to correspond to the conically tapering outer surface 44 of the connection section 20.

The connection section 22 has on the sheathing 46 a resting section 58 covering the end face of the connection part 16 (end-face end of the pipe section). The resting section 58 can come into contact with the resting section 56 of the connection section 20 when the connection parts 14, 16 are plugged together.

A projection 112, which can be designed as a lug, is provided on the connection section 22 on the sheathing 46. The projection 112 is designed in such a way that it is connected to a free end of the clamping lever 80 when said clamping lever 80 is in the position in which the clamping element 34 is clamped. The projection 112 is thereby a continuation of the contour of the clamping lever 80 (see in particular FIG. 6).

Figure 7:
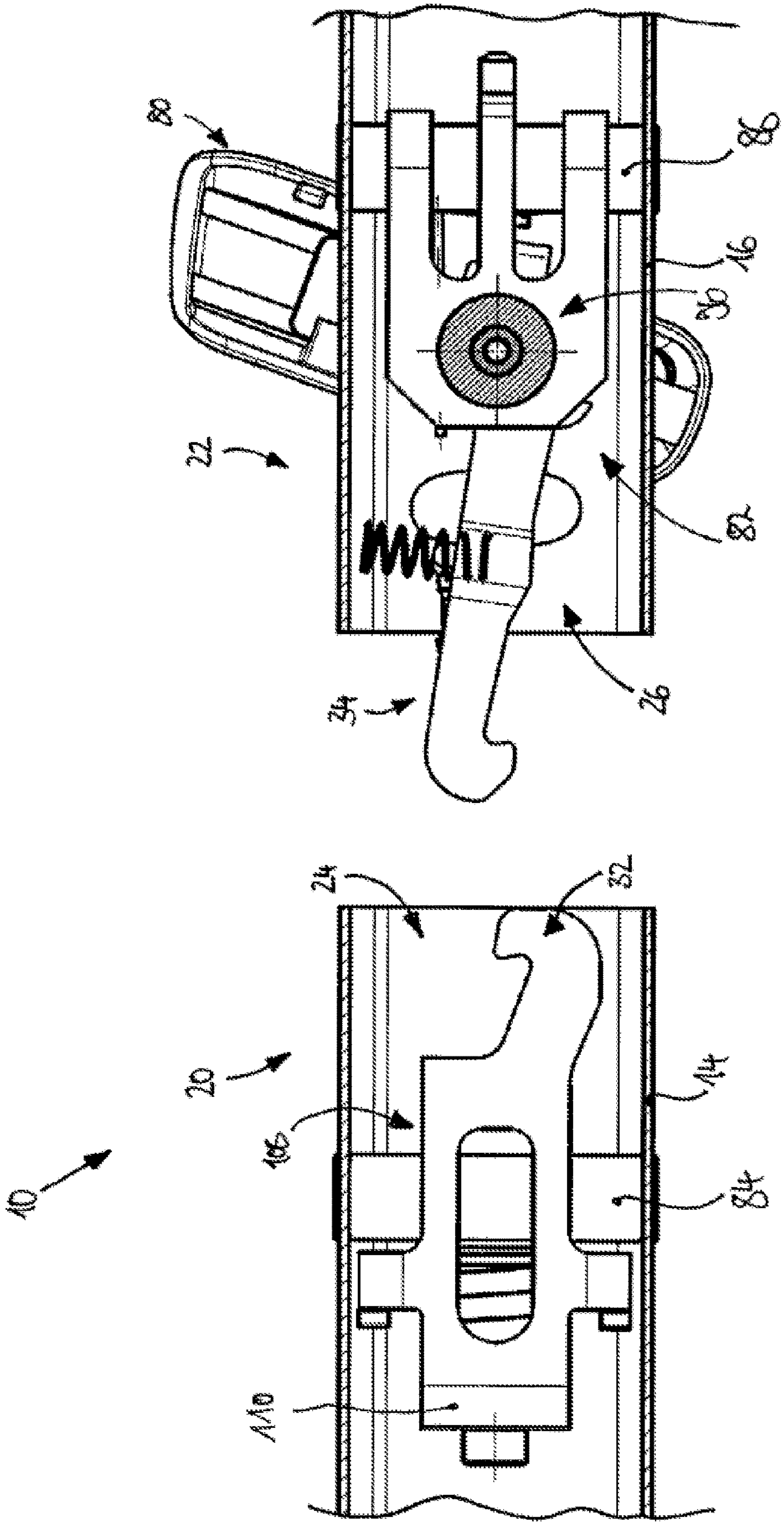
FIG. 7 is a longitudinal section through the connection sections and connection parts from FIG. 3, the sectional plane being arranged parallel to the wall which divides the cross-section of the connection parts into two separate sections.
Figure 8:
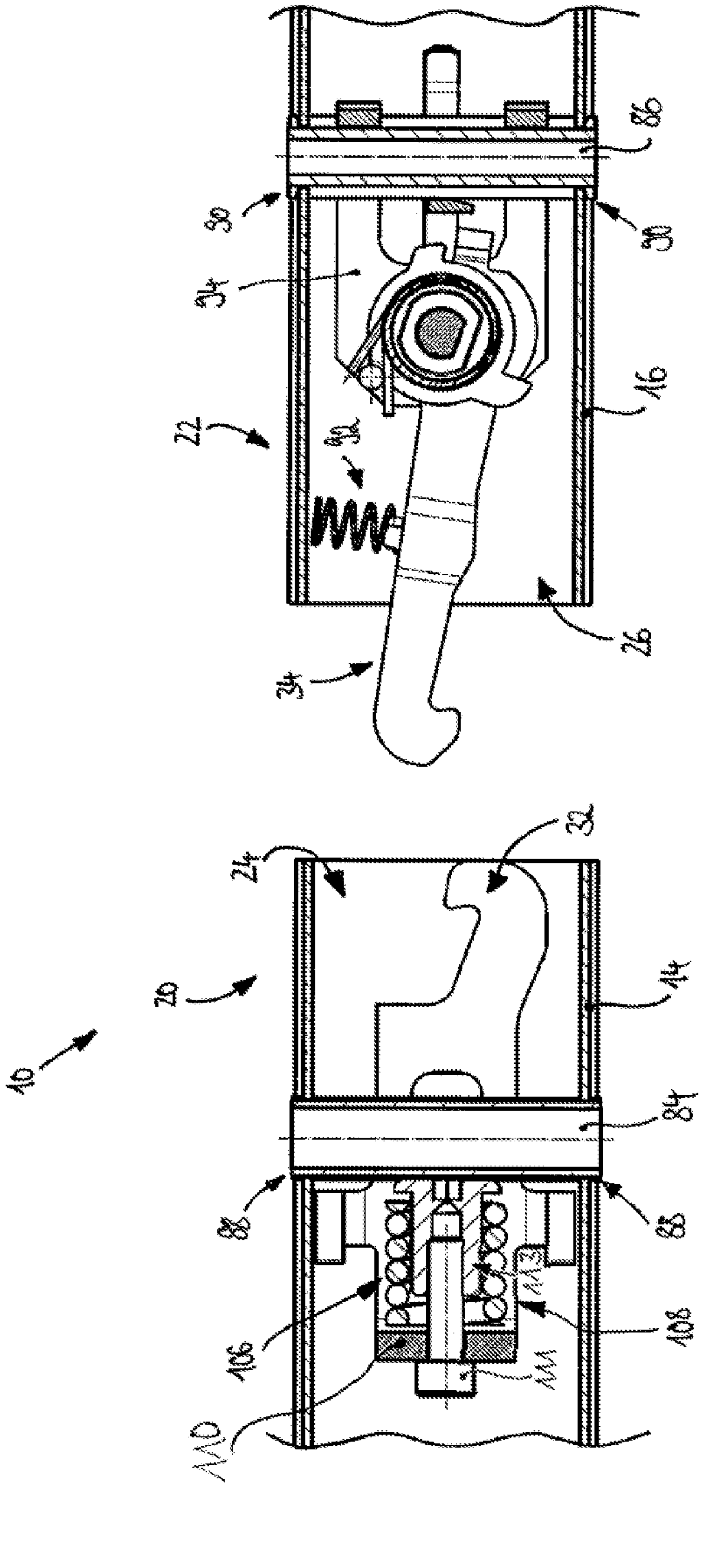
FIG. 8 is a sectional view similar to FIG. 7, with the sectional plane being arranged in such a way that it intersects the transverse bolts.

An actuatable clamping device 82 is provided on the connection section 22 of the connection part 16 and acts on the clamping element 34 (see in particular FIG. 7). The clamping element 34 and the counter element 32 are designed in such a way that they can be brought into engagement with one another when the connection sections 20, 22 are plugged together. By actuating the clamping device 82, the connection parts 14, 16 are clampable against one another when the clamping element 34 engages with the counter element 32.

The clamping device 82 is operable by means of the manually operable clamping lever 80. In addition, the clamping device 82 is designed in such a way that only the clamping lever 80 has to be actuated in order to clamp the connection parts 14, 16 by means of the clamping element 34 and counter element 32.

The clamping element 34 is rotatably mounted on the clamping device 82 and is preloaded relative to the counter element 32. As a result, the clamping element 34 and the counter element 32 come into engagement with one another when the connection sections 20, 22 are plugged together. For this purpose, a spring 92 is provided, which acts on the clamping element 34 and is supported, for example, on the inner wall of the pipe section of the connection part 16 (see in particular FIG. 8). The spring 92 is in particular a compression spring 92.

The clamping element 34 is secured to the connection part 16 by means of a transverse bolt 86. The transverse bolt 86 extends transversely to the longitudinal axis 12 through the cross-section 26 of the connection part 16. With each of its ends, the transverse bolt 86 engages in a passage 90 formed in the wall of the connection part 16 (see FIG. 8).

The clamping device 82 has a bearing part 94, which is designed as a bearing plate with a U-shaped cross-section (see inter alia FIGS. 7 to 10). The bearing part 94 envelops the transverse bolt 86 and defines a bearing point 96 spaced apart from the transverse bolt 86 and having a bearing axis 98 oriented orthogonally to the central longitudinal axis of the transverse bolt 86 (see in particular FIG. 10). The clamping lever 80 is pivotably mounted on the bearing point 96 of the bearing part 94 by means of a lever shaft 100, the clamping element 34 being coupled to the lever shaft 100 by means of an eccentric 102 (see in particular FIGS. 8 to 10).

The clamping device 82 can be designed in such a way that the clamping lever 80 can be moved further in the opening direction after the clamping element 34 has been released (for example counterclockwise in FIG. 4) in order to bring the clamping element 34 and the counter element 32 out of engagement, the connection parts 14, 16 thus being detachable from one another.

Figure 9:
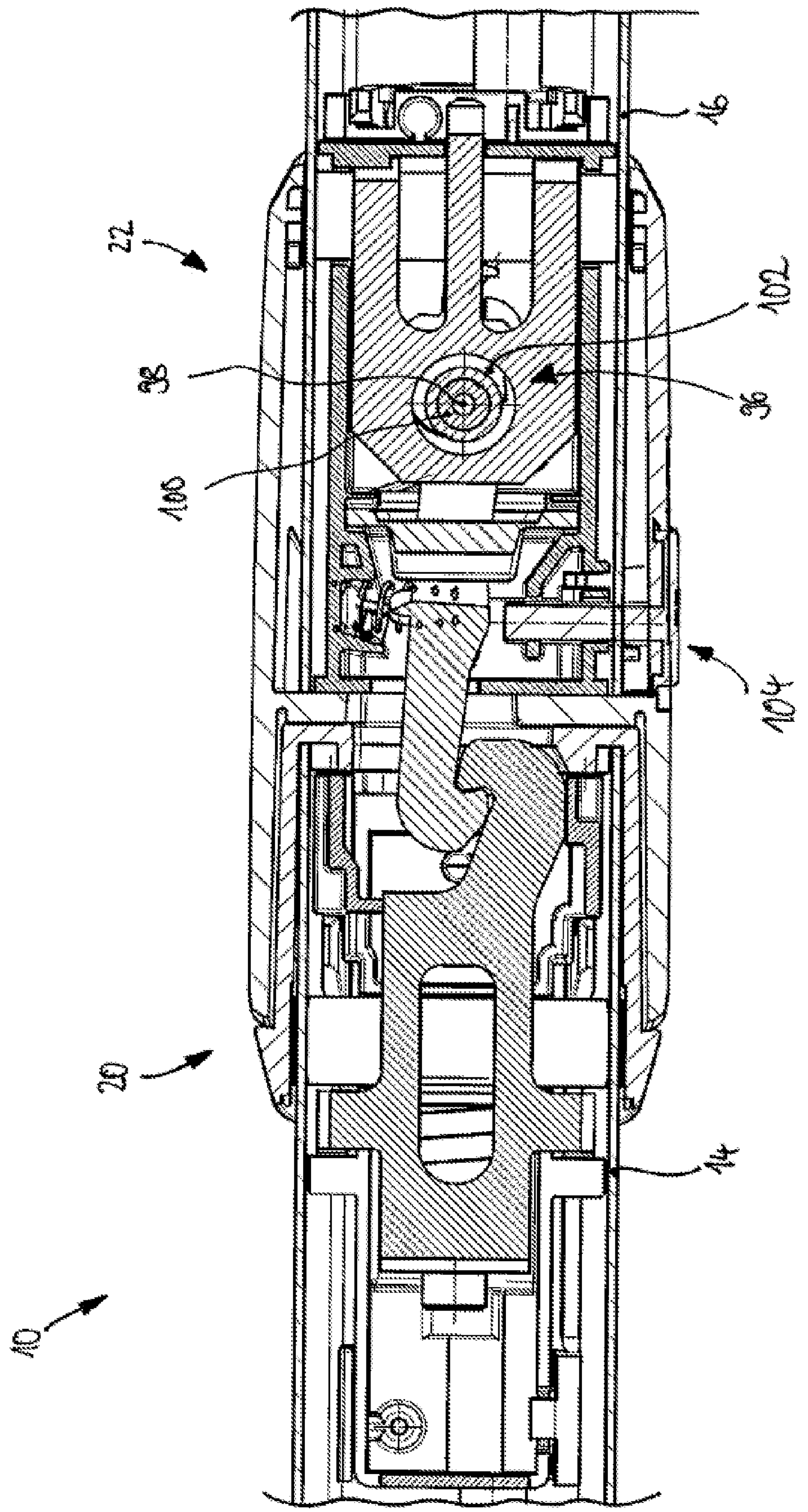
FIG. 9 is a longitudinal section through the plugged together connection sections according to FIG. 3, with the sectional plane intersecting the clamping element and the counter element.
Figure 10:
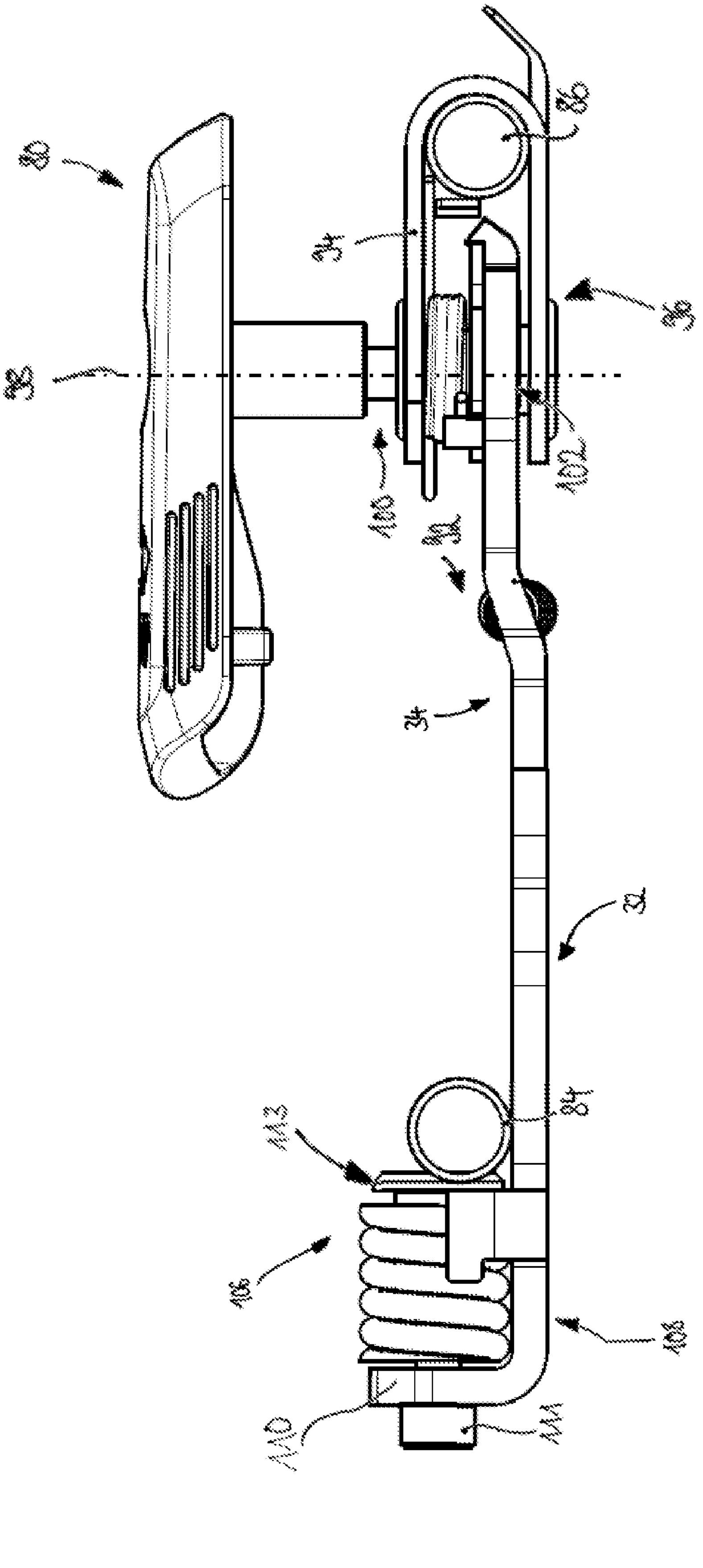
FIG. 10 shows the clamping device, clamping element and counter element of the connection assembly according to FIG. 3 in isolation.
Figure 11:
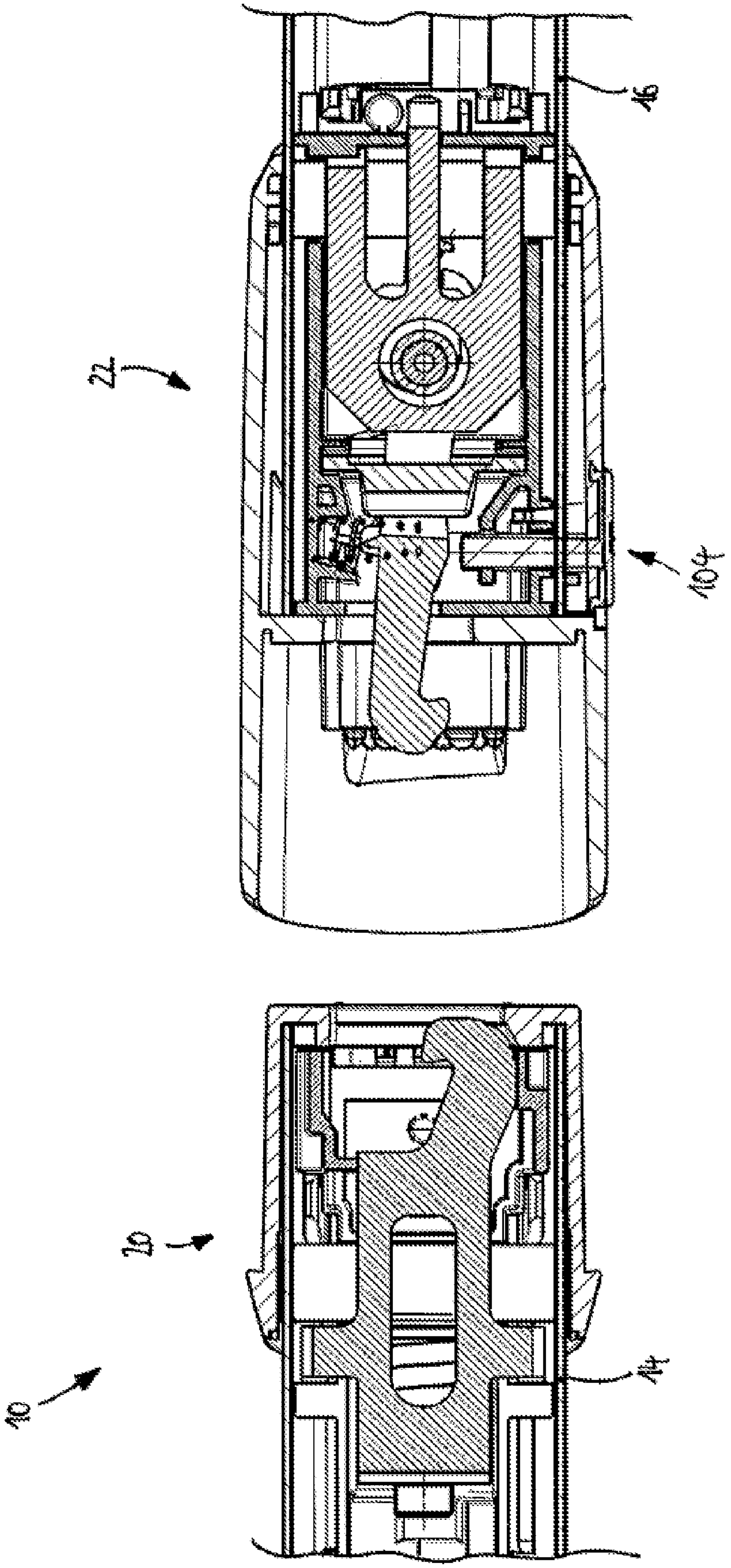
FIG. 11 is a longitudinal section through the connection sections according to FIG. 3 when not plugged together, with the sectional plane intersecting the clamping element and the counter element.
Figure 12:
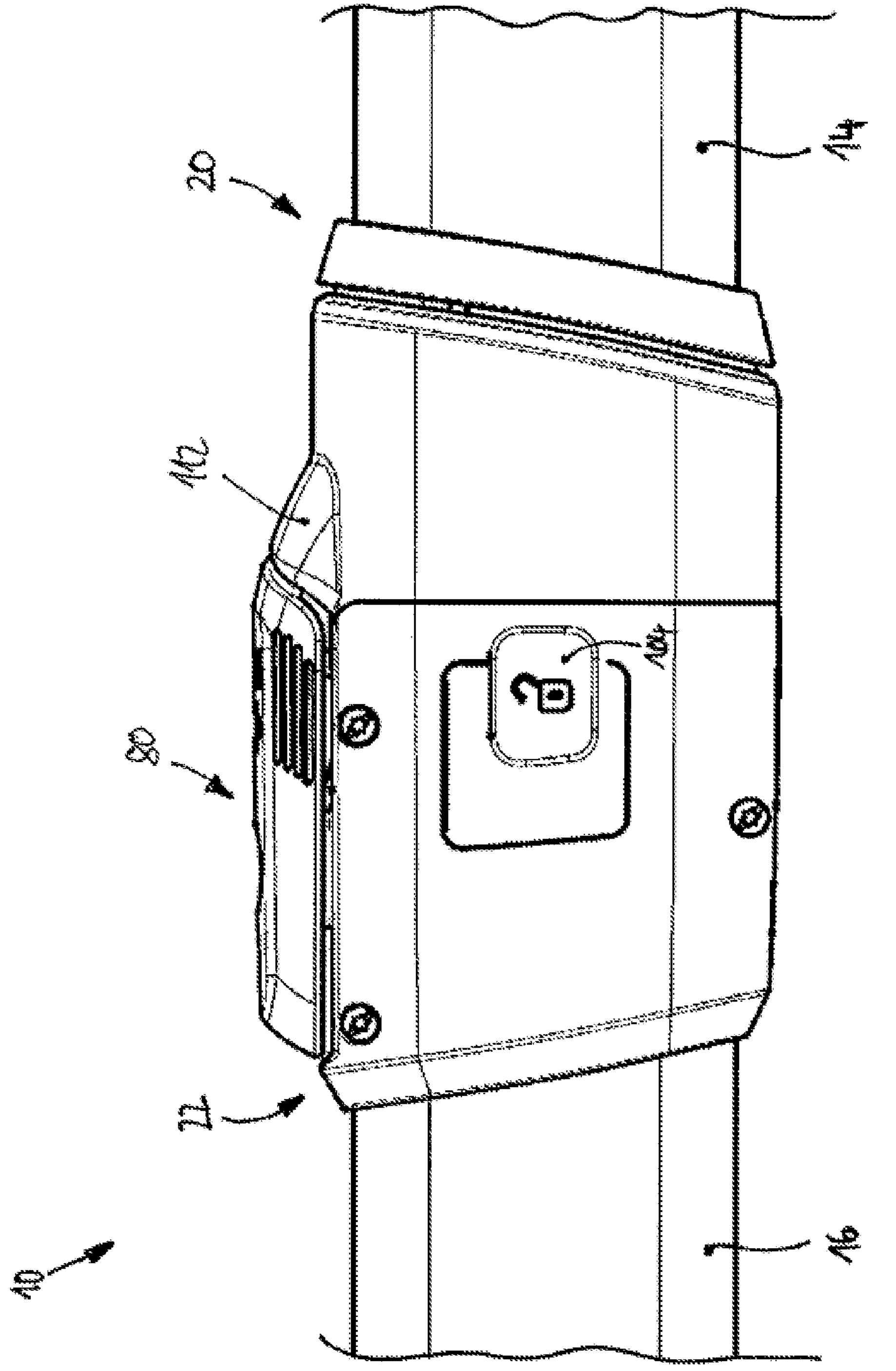
FIG. 12 is a side view of the plugged together connection sections according to FIG. 3.

Optionally, a button 104 that can be actuated by hand (for example by finger) can be provided on the connection section 22 of the connection part 16, which button acts on the clamping element 34, it being possible to bring the clamping element 34 and the counter element 32 (when the clamping device 82 is released) out of engagement by actuating the button 104 (see FIGS. 9, 11 and 12).

In the pipe section of the connection part 16, a wall 68 extending parallel to or along the longitudinal axis 12 is provided, which wall divides the (inner) cross-section of the connection part 16 into two separate sections 74, 76. The flow channel 42 is arranged in the first section 74. The clamping element 34 and the clamping device 82 and the electrical plug connector 30 are arranged in the further section 76 (cf. FIG. 6).

The plug connector 30 of the connection part 16 can optionally be mounted via an elastic element on the connection part 16. The plug connector 30 is thus movable relative to the connection part 16 (not shown). The plug connector 30 can be returned by the elastic element into a, preferably central, initial position. If the plug connector 30 were to rotate off-center, it can be returned into the initial position by means of the elastic element.

Optionally, one or more dust removal openings can be formed in the plug connector 30, in particular adjacent to its plug contacts. The dust removal openings can optionally be flow-connected to the flow channel 42 formed in the connection part 16.

FIGS. 14 to 17 show the connection part 16 in the form of an extension piece in isolation. The extension piece 16 extends in a longitudinal direction 12. The extension piece 16 has a pipe section which has the connection section 22 at one end (on the left in FIG. 14) and the connection section 20 at the other end (on the right in FIG. 14).

The connection section 22 of the extension piece 16 is designed corresponding to the connection section 22 of the connection part 16 described above (the same or functionally similar elements are provided with identical reference signs). To avoid repetition, reference is therefore made to the above statements regarding the connection section 22 of the connection part 16.

The connection section 20 of the extension piece 16 is designed corresponding to the connection section 20 of the connection part 14 described above (the same or functionally similar elements are provided with identical reference signs). To avoid repetition, reference is therefore made to the above statements regarding the connection section 20 of the connection part 14.

Notwithstanding the above, the following should be noted: In the pipe section of the extension piece 16, a wall 68 extending parallel to or along the longitudinal axis 12 is provided, which wall divides the cross-section of the extension piece 16 into two separate sections 74, 76.

The flow channel 42 is arranged in the first section 74. The flow channel 74 extends between the connection section 22 and the connection section 20 of the extension piece 16. The connection openings 36 and 38 both open into the flow channel 42.

In the further section 76, the electrical plug connector 28 and the counter element 32 are arranged on the connection section 20 and the clamping element 34 and the clamping device 82 and the electrical plug connector 30 are arranged on the connection section 22. The electrical plug connector 28 and the electrical plug connector 30 are electrically or electronically connected to one another by means of electrical or electronic lines extending through the further section 76. Therefore, current and/or control signals can be transmitted through the extension piece 16 by means of the electrical plug connectors 28, 30.

Figure 4:
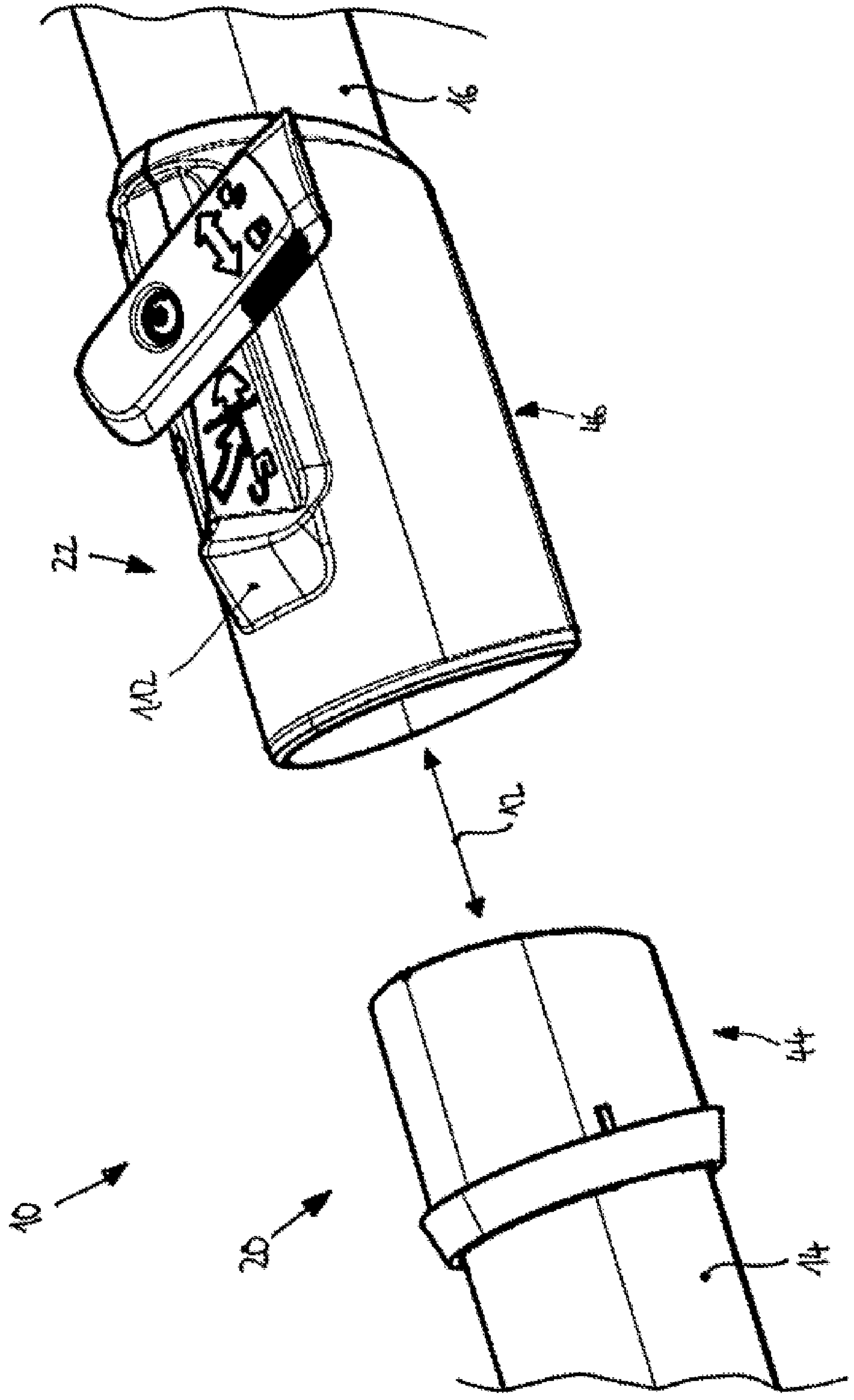
FIG. 4 is a perspective plan view of the connection sections from FIG. 3 when not plugged together.
Figure 6:
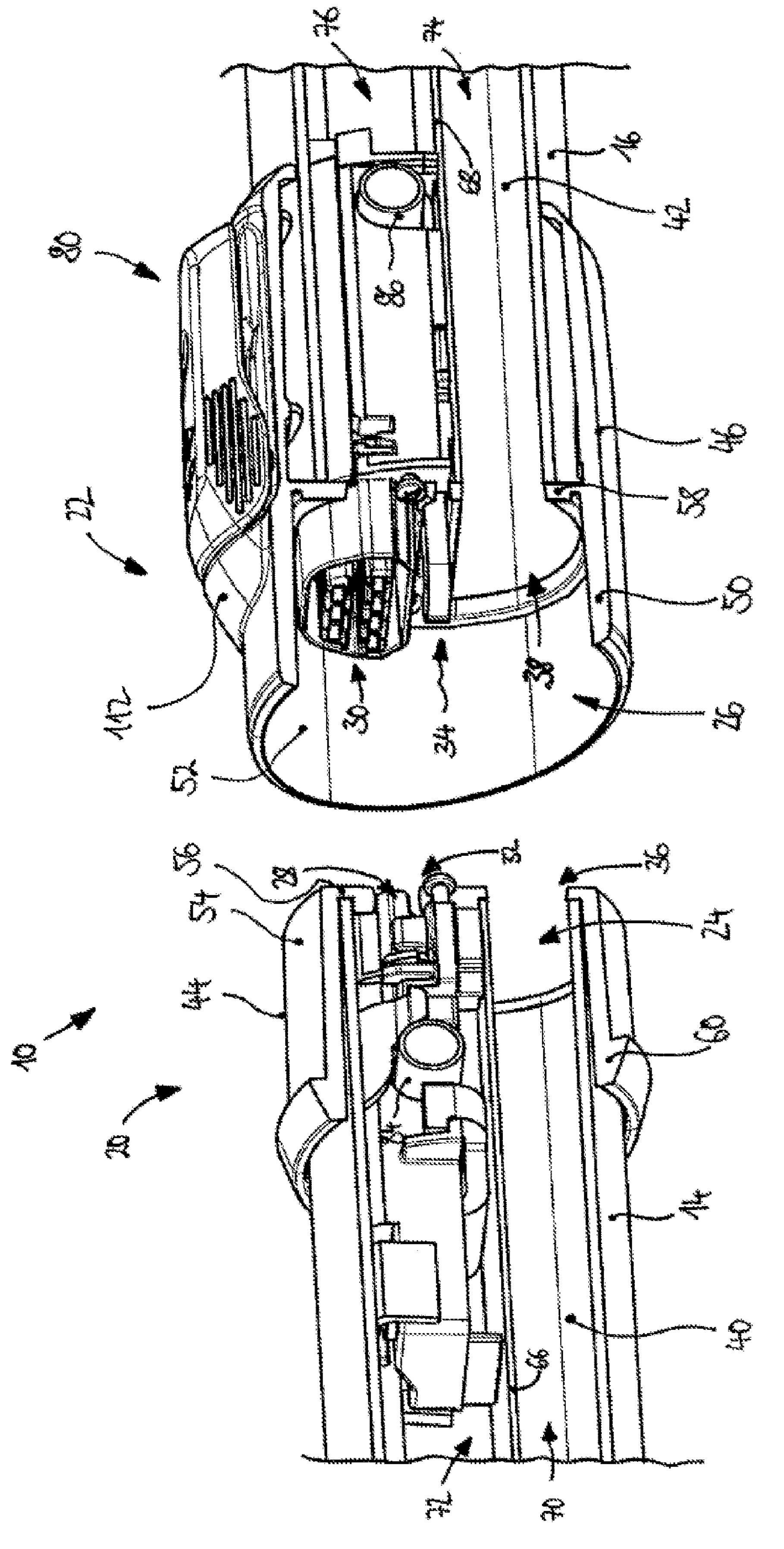
FIG. 6 is a partial longitudinal section through the connection sections and connection parts from FIG. 3.

The connection assembly 10 or a hand-operated machine tool equipped with the connection assembly 10 works as follows (explained with reference to the connection parts 14 and 16):

For the connection, the connection parts 14, 16 are first positioned relative to one another in such a way that the connection sections 20, 22 are aligned with one another in such a way that the connection sections 20, 22 can be plugged together (cf., for example, FIG. 4, 6 or 11).

Figure 3:
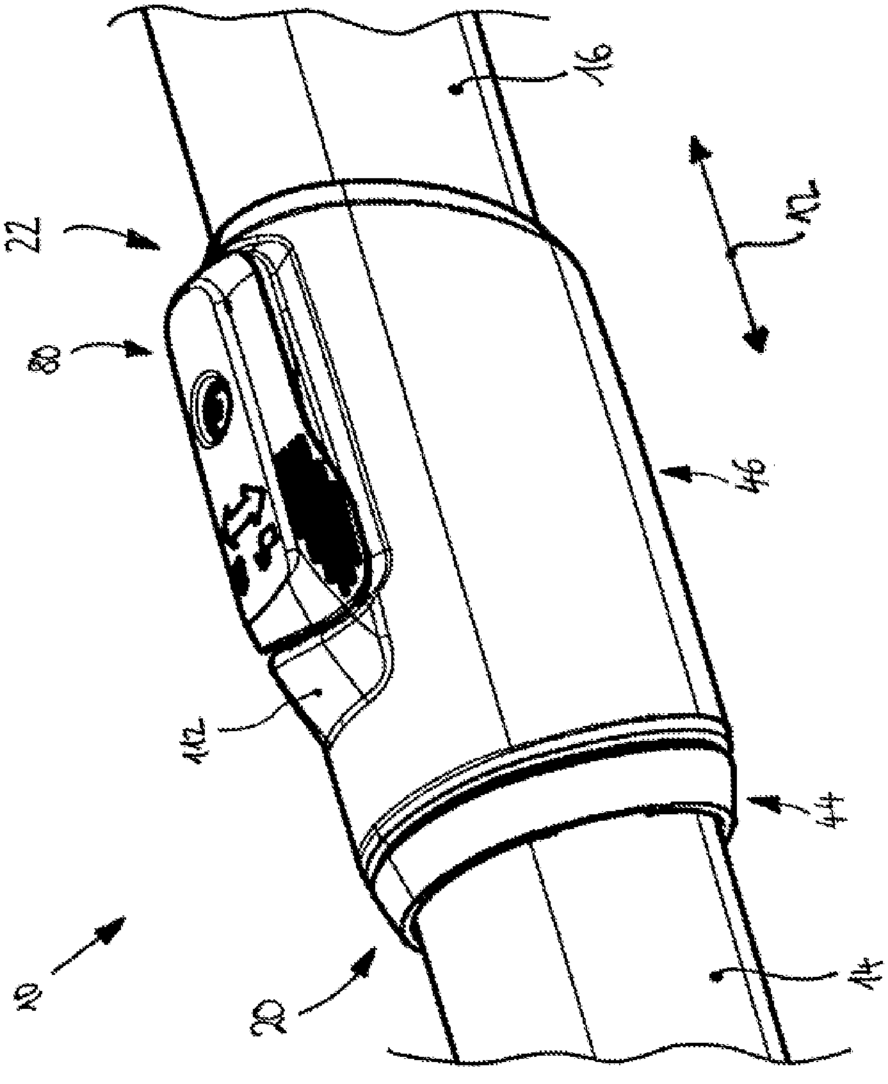
FIG. 3 is an enlarged view of two plugged together connection sections of two adjacent connection parts according to detail A in FIG. 2.

The connection sections 20, 22 are then plugged together and the clamping lever 80 can be closed (cf., for example, FIG. 3 or 9). Once the connection segments are plugged together, the clamping element 34 and the counter element 32 come into engagement with one another (behind one another), since the clamping element 34 is preloaded relative to the counter element 32 by the spring 92 (cf., for example, FIG. 8).

In addition, the plug connectors 28, 30 are also connected to one another when the connection sections are plugged together. If an end position is reached when the connection sections are plugged together, for example when the resting section 56 of the connection section 20 comes into contact with the resting section 58 of the connection section 22, the connection openings 36, 38 are also aligned with one another in such a way that the flow channel 40 and the flow channel 42 are flow-connected to one another.

By pivoting the clamping lever 80, the clamping device 82 is actuated, which device acts on the clamping element 34, which clamping element engages with the counter element 32 from behind (see FIG. 9). The clamping element 34 is thereby pulled inward (axially) in the longitudinal direction 12 by means of the eccentric 102 in the connection part 16. As a result of the connection parts 14, 16 resting against one another at the connection sections 20, 22, for example by means of the task sections 56, 58, and the clamping element 34 applying a tensile force to the counter element 32, the connection parts 14, 16 are clamped together.

In this state, an electrical plug connection is established between the plug connectors 28, 30. A mechanical clamping connection is established by the counter element 32 and the clamping element 34. A flow connection is also established between the connection parts 14, 16 by the mutually aligned connection openings 36, 38.

For the detachment, the clamping lever 80 has to be pivoted in the opening direction, as a result of which the clamping device 82 is actuated and the clamping element 34 is released (tensile force is relieved). The clamping element 34 and the counter element 32 are still engaged behind one another.

In order to bring the clamping element 34 and the counter element 32 out of engagement, the clamping lever 80 has to be pivoted further in the opening direction or, alternatively, the button 104 has to be actuated. As a result, the clamping element 34 is pivoted in such a way that it is disengaged from the counter element 32. The mechanical clamping connection is thus released.

The connection parts 14, 16 can then be separated from one another or pulled apart. By separating the electrical plug connectors 28, 20 and the connection openings 26, 38, the electrical plug connection and the flow connection between the connection parts 14, 16 are also released.

The invention claimed is:

1. Connection assembly for connecting a tool head and a further machine module of a machine tool, wherein the connection assembly comprises at least two connection parts following one another along a longitudinal axis and each having a connection section via which the connection parts are connectable to one another, wherein the connection sections each delimit an inner cross section to the outside, wherein inside the respective cross section an electrical plug connector, a mechanical clamping element and a connection opening to a flow channel formed in the respective connection part are provided in such a way that when the connection sections are plugged together, the clamping elements engage behind one another and the plug connectors and/or the connection openings are respectively connected to one another.

2. Connection assembly according to claim 1, wherein the connection parts are detachably connectable to each other.

3. Connection assembly according to claim 1, wherein the clamping element is arranged substantially centrally within the cross section.

4. Connection assembly according to claim 1, wherein the plug connector is arranged on one side of the clamping element and in that the connection opening of the flow channel is arranged on the side of the clamping element facing away from the plug connector.

5. Connection assembly according to claim 1, wherein the connection sections each have a single-part or multi-part sheathing which encloses the respective connection parts sectionally.

6. Connection assembly according to claim 1, wherein one of the connection sections has a collar projecting parallel to the longitudinal axis, by which said connection section encompasses the opposite connection section when plugged together.

7. Connection assembly according to claim 6, wherein the collar has a sheathing and an outwardly widening, conically shaped, inner surface, and in that the opposite connection section, on its sheathing, has an outwardly tapering, conically tapered, outer surface.

8. Connection assembly according to claim 6, wherein the connection sections have sheathings and on their sheathing, have a resting section covering the end face of the respective connection part, the resting sections coming into contact with one another when the connection sections are plugged together.

9. Connection assembly according to claim 6, wherein the connection section, which is encompassed by the opposite connection section when plugged together, has a radially projecting protrusion at its end facing away from the free end of the respective connection part.

10. Connection assembly according to claim 1, wherein the plug connectors are embodied as multipole connectors with at least two poles each.

11. Connection assembly according to claim 1, wherein the plug connector, the clamping element and/or the connection opening are arranged flush with or inwardly offset relative to the end face of the connection section.

12. Connection assembly according to claim 1, wherein at least one of the plug connectors is mounted via an elastic element on the connection section or on the connection part respectively.

13. Connection assembly according to claim 12, wherein the plug connector is returnable by the elastic element into a central, initial position.

14. Connection assembly according to claim 1, wherein the plug connector includes plug contacts and one or more dust removal openings are formed in the plug connector adjacent to the plug contacts.

15. Connection assembly according to claim 1, wherein the plug connectors of the connection sections of a first of the connection parts and of the second connection part are formed partially or fully complementary to each other.

16. Connection assembly according to claim 1, wherein the connection parts each have a wall extending parallel to or along the longitudinal axis, wherein the wall divides the cross-section of the connection parts into separate sections respectively, wherein the flow channel is arranged in a first section respectively and the plug connector and the clamping element are arranged in a further section respectively.

17. Connection assembly according to claim 1, wherein an actuating device is arranged on at least one of the connection sections, wherein the actuating device is coupled via a clamping device to the clamping element arranged on this connection section, so that the connection parts are clampable against one another by actuation of the actuating device when the clamping elements are engaged.

18. Connection assembly according to claim 1, wherein a further connection part is provided, which has a connection section at each end, so that the further connection part can be inserted as an extension piece between the two connection parts and connected thereto.

19. Machine tool, having a tool head, a further machine module and a connection assembly for connecting the tool head and the further machine module, the connection assembly comprising at least two connection parts following one another along a longitudinal axis and each having a connection section via which the connection parts are connectable to one another, wherein the connection sections each delimit an inner cross section to the outside, wherein inside the respective cross section an electrical plug connector a mechanical clamping element and a connection opening to a flow channel formed in the respective connection part are provided in such a way that when the connection sections are plugged together, the clamping elements engage behind one another and the plug connectors and/or the connection openings are respectively connected to one another.

20. Extension piece for a connection assembly, the connection assembly comprising at least two connection parts following one another along a longitudinal axis and each having a connection section via which the connection parts are connectable to one another, wherein the connection sections each delimit an inner cross section to the outside, wherein inside the respective cross section an electrical plug connector a mechanical clamping element and a connection opening to a flow channel formed in the respective connection part are provided in such a way that when the connection sections are plugged together, the clamping elements engage behind one another and the plug connectors and/or the connection openings are respectively connected to one another.

21. Extension piece for a connection assembly for connecting a tool head and a further machine module of a machine tool, wherein the extension piece has at both ends a respective connection section via which the extension piece is connectable to a connection part of the connection assembly respectively, wherein the connection sections of the extension piece each delimit an inner cross-section towards the outside, characterized in that within the respective cross-section an electrical plug connector, a mechanical clamping element and a connection opening to a flow channel formed in the extension piece are provided.

22. Extension piece according to claim 21, wherein the electrical plug connector, the mechanical clamping element and the connection opening are provided in such a way that, when a connection section of the extension piece is plugged together with a connection part of the connection assembly, the clamping elements engage behind one another and the plug connectors and/or the connection openings are respectively connected to one another.

23. Extension piece according to claim 21, wherein the connection sections of the extension piece are formed complementarily to one another.

24. Extension piece according to claim 21, wherein the clamping element is arranged substantially centrally within the cross-section.

25. Extension piece according to claim 21, wherein the plug connector is arranged on one side of the clamping element and in that the connection opening of the flow channel is arranged on the side of the clamping element facing away from the plug connector.

26. Extension piece according to claim 21, wherein the plug connectors are designed as multipole connectors with at least two poles each.

27. Extension piece according to claim 21, characterized in that the plug connector, the clamping element and/or the connection opening are arranged flush with or offset inwardly relative to the end face of the connection section.

28. Extension piece according to claim 21, wherein an actuating device is arranged on one of the connecting sections and is coupled via a clamping device to the clamping element arranged on this connecting section.

29. Extension piece according to claim 21, wherein the extension piece has a wall extending parallel to or along the longitudinal axis respectively, wherein the wall divides the cross-section of the extension piece into separate sections, wherein the flow channel is arranged in a first section and the plug connector and the clamping element are respectively arranged in a further section.

* * * * *